(12) United States Patent
Barbosa et al.

(10) Patent No.: US 11,149,811 B2
(45) Date of Patent: Oct. 19, 2021

(54) BRAKE CLIP FOR DISC BRAKE ASSEMBLY AND DISC BRAKE ASSEMBLY INCLUDING SUCH A BRAKE CLIP

(71) Applicants: ZF Active Safety US Inc., Livonia, MI (US); Lucas Automotive GmbH, Koblenz (DE)

(72) Inventors: Manuel Barbosa, Novi, MI (US); Kraig E. Gerber, Plymouth, MI (US); Anthony Dixon, Livonia, MI (US); Frank Madzgalla, Koblenz (DE); Juergen Korte, Holzappel (DE); Tobias Lenarz, Darscheid (DE); Raphael Mueller, Ochtendung (DE); Philip Kexel, Montabaur (DE)

(73) Assignees: ZF Active Safety US Inc., Livonia, MI (US); Lucas Automotive GmgH, Koblenz (DE)

( * ) Notice: Subject to any disclaimer, the term of this patent is extended or adjusted under 35 U.S.C. 154(b) by 0 days.

(21) Appl. No.: 16/532,037

(22) Filed: Aug. 5, 2019

(65) Prior Publication Data

US 2019/0360539 A1    Nov. 28, 2019

Related U.S. Application Data

(62) Division of application No. 15/373,058, filed on Dec. 8, 2016, now Pat. No. 10,415,660.

(51) Int. Cl.
*F16D 65/097*     (2006.01)
*F16D 55/2265*    (2006.01)
*F16D 65/02*      (2006.01)

(52) U.S. Cl.
CPC ..... *F16D 65/0978* (2013.01); *F16D 55/2265* (2013.01); *F16D 2065/1396* (2013.01)

(58) Field of Classification Search
CPC .. F16D 55/2265; F16D 55/225; F16D 65/097; F16D 65/0972; F16D 2065/1396
See application file for complete search history.

(56) References Cited

U.S. PATENT DOCUMENTS

| RE30,255 E   | 4/1980 | Rath et al.     |
|--------------|--------|-----------------|
| 5,323,882 A  | 6/1994 | Waterman et al. |

(Continued)

FOREIGN PATENT DOCUMENTS

| CN | 1384904 A | 12/2002 |
|----|-----------|---------|
| CN | 1802519   | 7/2006  |

(Continued)

OTHER PUBLICATIONS

First Chinese Office Action, Application No. 201380006604.0, dated Apr. 12, 2016.

(Continued)

*Primary Examiner* — Thomas W Irvin
(74) *Attorney, Agent, or Firm* — Robert James Harwood

(57) ABSTRACT

A disc brake assembly includes a brake clip having a U-shaped section, at least one retention tang, and an abutment leg. The U-shaped section has a base leg and opposing upper and lower legs extending from the base leg. The upper leg has an inner face facing the lower leg. The at least one tang extends away from the U-shaped section and inner face. The abutment leg extends from the lower leg and has a midpoint between a top edge and a bottom edge. The midpoint is not planar with the top and bottom edges.

17 Claims, 7 Drawing Sheets

(56) References Cited

U.S. PATENT DOCUMENTS

| | | |
|---|---|---|
| 5,687,817 A | 11/1997 | Kobayashi et al. |
| 5,699,882 A | 12/1997 | Ikegami et al. |
| 5,901,815 A | 5/1999 | Kobayashi et al. |
| 5,941,348 A | 8/1999 | Matsumoto et al. |
| 5,947,233 A | 9/1999 | Kobayashi et al. |
| 6,003,642 A | 12/1999 | Mori et al. |
| 6,223,866 B1 | 5/2001 | Giacomazza |
| 6,286,636 B1 | 9/2001 | Iwata |
| 6,478,122 B1 | 11/2002 | Demoise, Jr. et al. |
| 6,481,544 B2 | 11/2002 | Brecht et al. |
| 6,527,090 B1 | 3/2003 | Barillot et al. |
| 7,040,464 B1 | 5/2006 | Andrews et al. |
| 7,086,506 B2 | 8/2006 | Wemple et al. |
| 7,299,903 B2 | 11/2007 | Rockwell et al. |
| 7,578,374 B2 | 8/2009 | Takeo et al. |
| 7,784,591 B2 | 8/2010 | Franz et al. |
| 8,397,880 B2 * | 3/2013 | Chelaidite ........... F16D 65/0977 188/73.38 |
| 9,206,867 B2 | 12/2015 | Lou et al. |
| 9,279,466 B2 * | 3/2016 | Miura .................. F16D 65/0977 |
| 9,388,868 B2 | 7/2016 | Merrien et al. |
| 9,568,055 B2 | 2/2017 | Miller et al. |
| 9,677,629 B2 * | 6/2017 | Boyle .................... F16D 55/225 |
| 9,777,783 B2 | 10/2017 | Asahi et al. |
| 10,400,838 B2 * | 9/2019 | Reynolds ................ F16D 55/22 |
| 2007/0017756 A1 | 1/2007 | Takeo et al. |
| 2009/0277729 A1 | 11/2009 | Kim |
| 2010/0243385 A1 * | 9/2010 | Kaneko ............... F16D 65/0972 188/73.31 |
| 2011/0168503 A1 * | 7/2011 | Chelaidite .......... F16D 65/0972 188/73.31 |
| 2012/0186918 A1 * | 7/2012 | Wakabayashi .......... F16D 55/22 188/72.3 |
| 2012/0205205 A1 * | 8/2012 | Lethorn .............. F16D 65/0972 188/234 |
| 2013/0001024 A1 | 1/2013 | Odaira et al. |
| 2013/0192938 A1 | 8/2013 | Miller et al. |
| 2014/0305753 A1 | 10/2014 | Macy et al. |
| 2014/0326548 A1 | 11/2014 | Merrien et al. |
| 2015/0021127 A1 * | 1/2015 | Miura ................. F16D 65/0972 188/73.38 |
| 2016/0053837 A1 * | 2/2016 | Lou ..................... F16D 65/0978 188/73.38 |
| 2017/0146083 A1 | 5/2017 | Miller et al. |
| 2017/0299004 A1 * | 10/2017 | Mallmann .............. F16D 55/225 |
| 2018/0023645 A1 * | 1/2018 | Reynolds ............ F16D 65/0977 188/73.38 |
| 2018/0038431 A1 * | 2/2018 | Gerber ................ F16D 65/0972 |

FOREIGN PATENT DOCUMENTS

| | | |
|---|---|---|
| EP | 1600653 A1 | 11/2005 |
| JP | H08226470 A | 9/1996 |
| JP | 11082570 | 3/1999 |
| JP | 3213191 B2 | 10/2001 |
| JP | 2003139171 A | 5/2003 |
| JP | 2003222171 A | 8/2003 |
| JP | 2011202779 | 10/2011 |
| TW | 396119 B | 7/2000 |
| WO | 2016141135 | 9/2016 |

OTHER PUBLICATIONS

International Search Report, Application No. PCT/US2013/022862, dated Jun. 14, 2013.

\* cited by examiner

BRAKE CLIP FOR DISC BRAKE ASSEMBLY AND DISC BRAKE ASSEMBLY INCLUDING SUCH A BRAKE CLIP

BACKGROUND OF INVENTION

This invention relates in general to vehicle disc brake assemblies and in particular to an improved structure for a brake clip for use in such a disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a brake rotor which is secured to a wheel of the vehicle for rotation therewith. The disc brake assembly further includes a caliper that is slidably supported on guide pins secured to an anchor bracket. The anchor bracket, in turn, is secured to a non-rotatable component of the vehicle, such as the axle flange or steering knuckle, which is connected to the vehicle frame. The caliper includes a pair of brake pads which are disposed on opposite sides of the brake rotor. The brake pads are connected to one or more hydraulically or pneumatically actuated pistons for movement between a non-braking position and a braking position. In the braking position, the brake pads are moved into frictional engagement with the opposed braking surfaces of the brake rotor. For example, when the operator of the vehicle depresses the brake pedal, the piston urges the brake pads from the non-braking position to the braking position so as to frictionally engage the opposed braking surfaces of the brake rotor and thereby slow or stop rotation of the associated wheel of the vehicle.

When the disc brake assembly is not actuated, the brake pads are normally spaced apart from the opposite sides of the rotor. Because the brake pads are not positively engaged with the rotor, the brake pads are free to move relative to other brake and vehicle components during vehicle operation. As a result, vehicle induced vibration loads are known to cause undesirable rattle or other noises between the brake pads and the other brake components. To prevent this from occurring, it is known to provide at least one brake clip between the anchor bracket and the brake pad.

The brake clip has tangs that engage a surface of the anchor bracket to retain the brake clip in a channel of the anchor bracket. However, to install the brake clip in the channel, a high installation force is needed to engage the tangs with the surface of the anchor bracket. The high installation force may result in under or over installation of the brake clip in the channel. Under or over installation of the brake clip may result in the brake clip being tilted and performing poorly. Thus, it would be desirable to have a brake clip that requires a lesser installation force.

SUMMARY OF INVENTION

This invention relates to a brake clip for use in a disc brake assembly.

According to one embodiment, a disc brake assembly may comprise, individually and/or in combination, one or more of the following features: a brake clip. The brake clip has a U-shaped section, at least one retention tang, and an abutment leg. The U-shaped section has a base leg with opposing upper and lower legs extending from the base leg. The upper leg has an inner face facing the lower leg. The at least one retention tang extends away from the U-shaped section and inner face. The abutment leg extends from the lower leg and has a midpoint between a top edge and a bottom edge. The midpoint is not planar with the top and bottom edges.

According to another embodiment, a disc brake assembly may comprise, individually and/or in combination, one or more of the following features: a brake clip having a U-shaped section, a retention tang, and a retraction spring. The U-shaped section has a base leg with opposing upper and lower legs extending from the base leg. The upper leg has an inner face facing the lower leg. The retention tang extends from the U-shaped section and away from the inner face. The retraction spring has a first retraction spring portion extending from the base leg, a second retraction spring portion extending from the first retraction spring portion, and a first position without loading. The first and second retraction spring portions move from the first position to a second position when loaded to a threshold load. The first retraction spring portion remains at the second position, and the second retraction spring portion moves from the second position, when loaded beyond the threshold load.

According to another embodiment, a disc brake assembly may comprise, individually and/or in combination, one or more of the following features: a brake clip and an anchor bracket. The brake clip has a U-shaped section having a base leg with opposing upper and lower legs extending from the base leg and at least one retention tang extending from the U-shaped section. The anchor bracket has a channel in which the brake clip is mounted. The at least one tang is engaged in a groove in an upper surface of the channel.

A potential advantage of an embodiment of the brake clip is a reduced installation force for the brake clip. Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
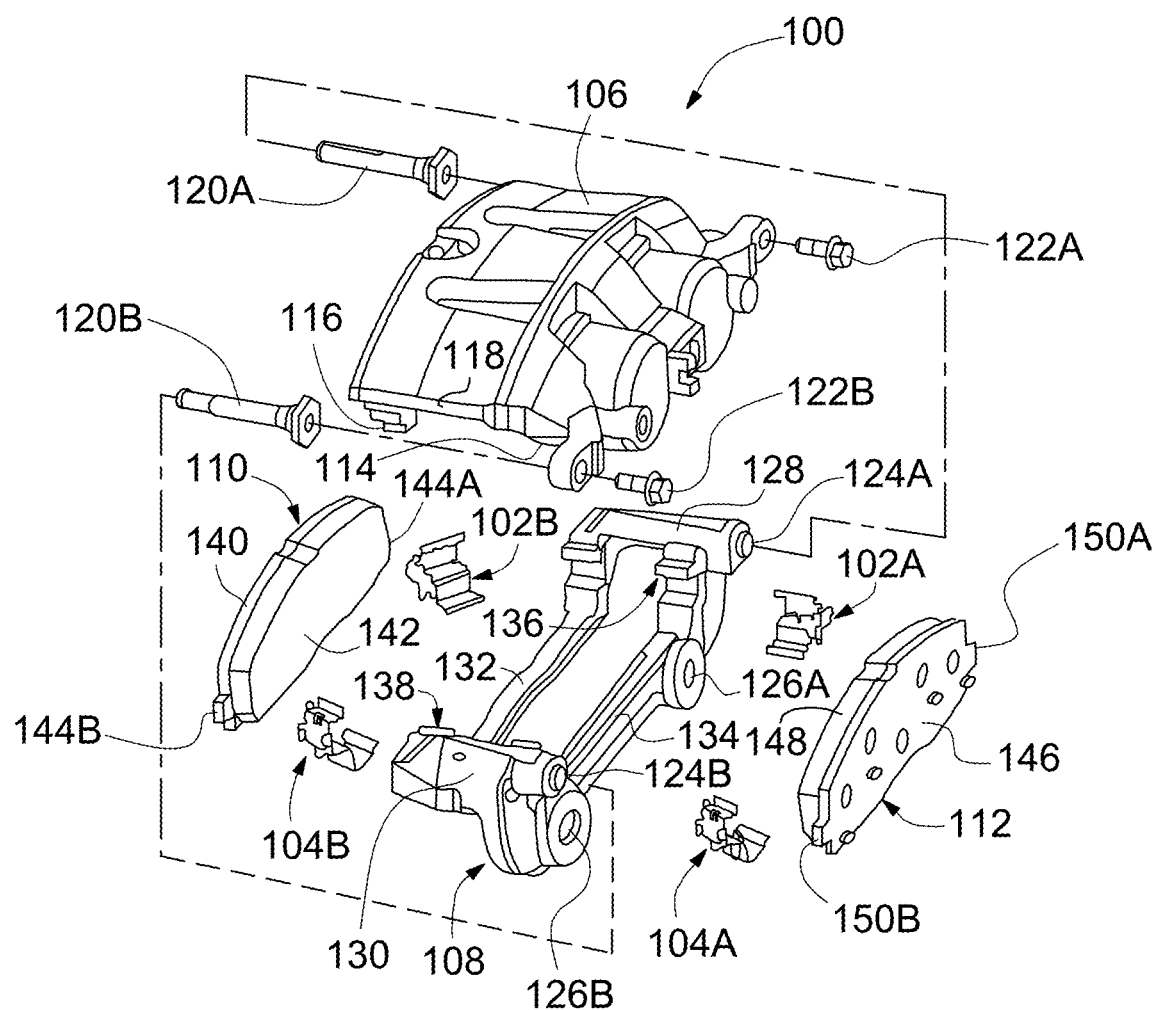
FIG. 1 is an exploded perspective view of a disc brake assembly including a first embodiment of a brake clip in accordance with the present invention.
Figure 2:
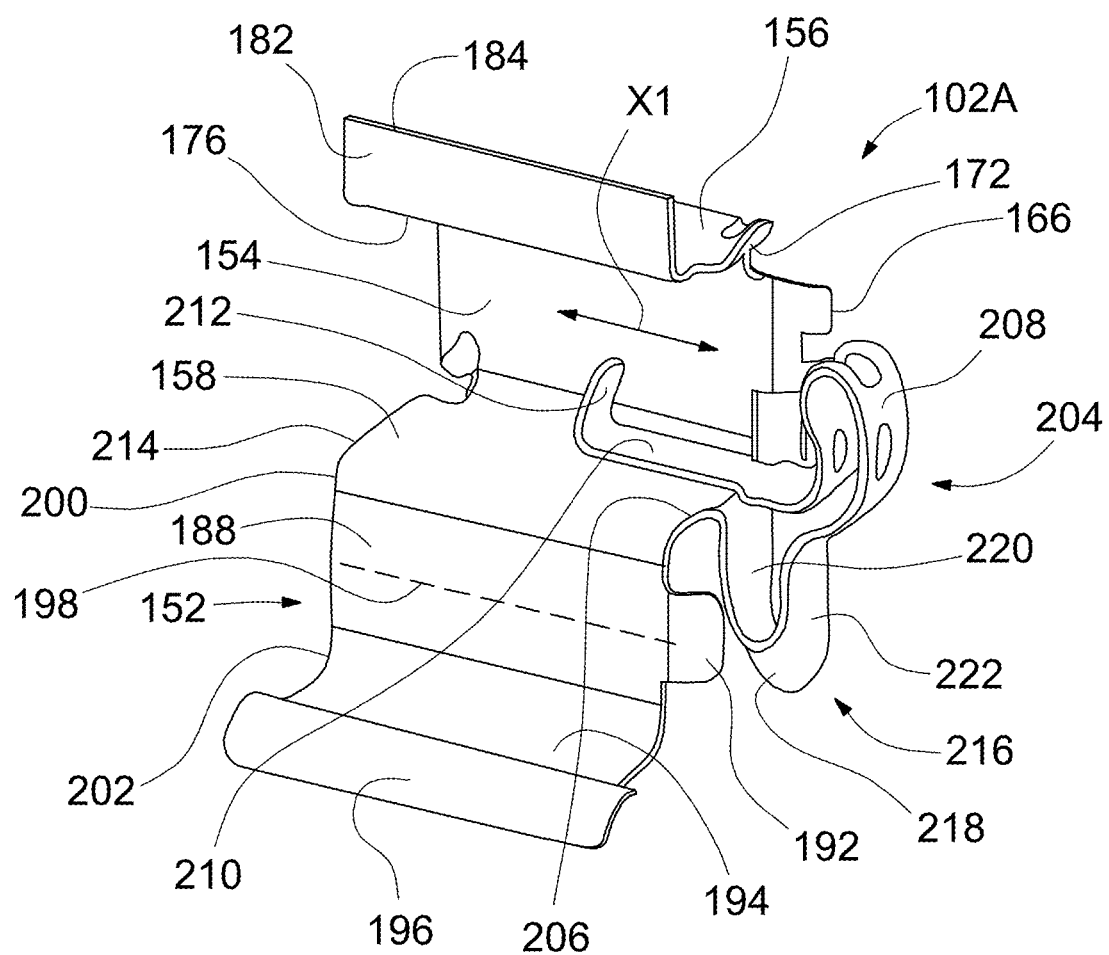
FIG. 2 is a perspective view of the brake clip illustrated in FIG. 1.
Figure 3:
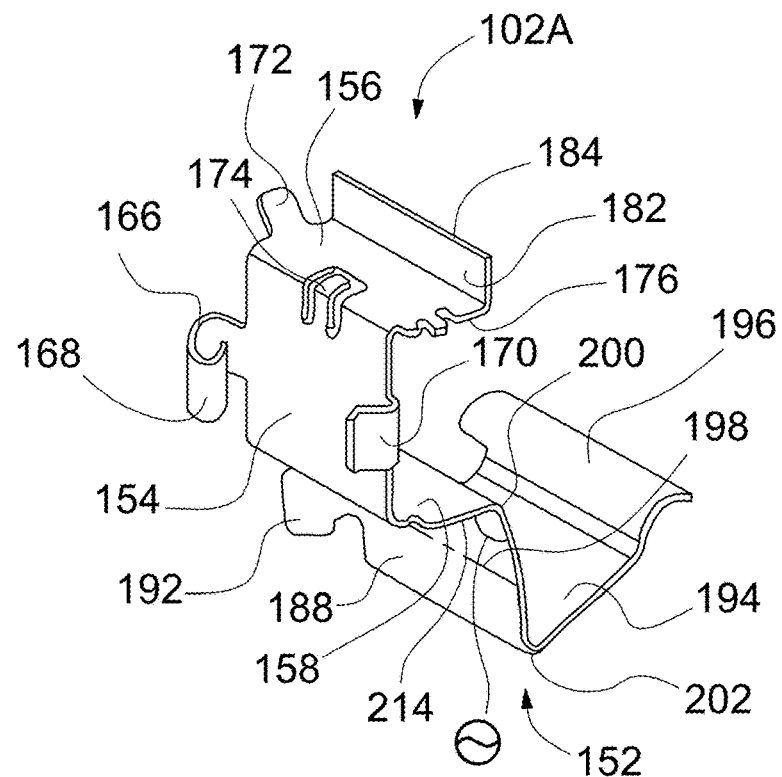
FIG. 3 is an additional perspective view of the brake clip illustrated in FIG. 1.
Figure 4:
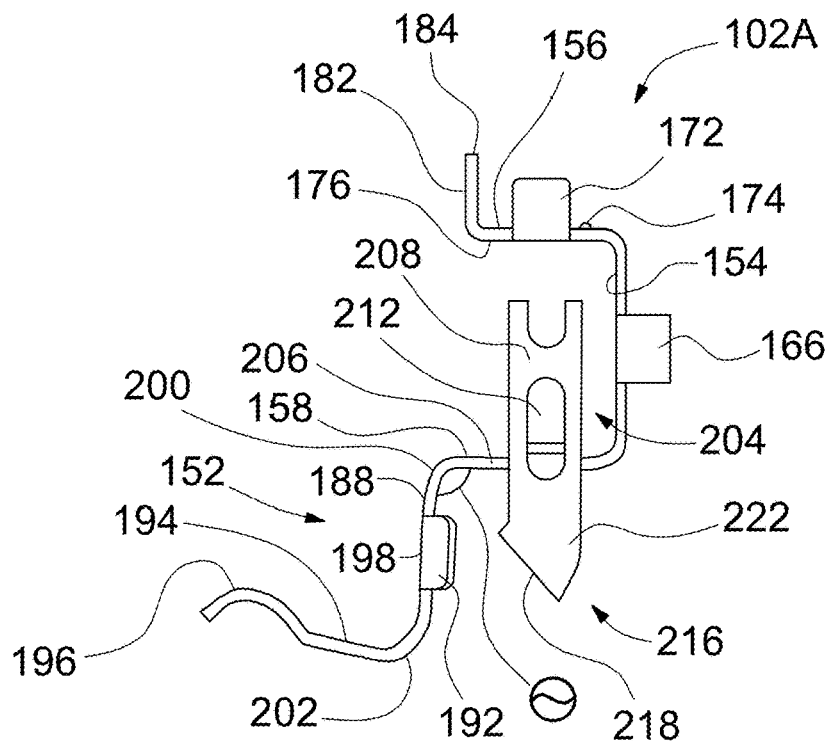
FIG. 4 is an elevation view of the brake clip illustrated in FIG. 1.
Figure 5:
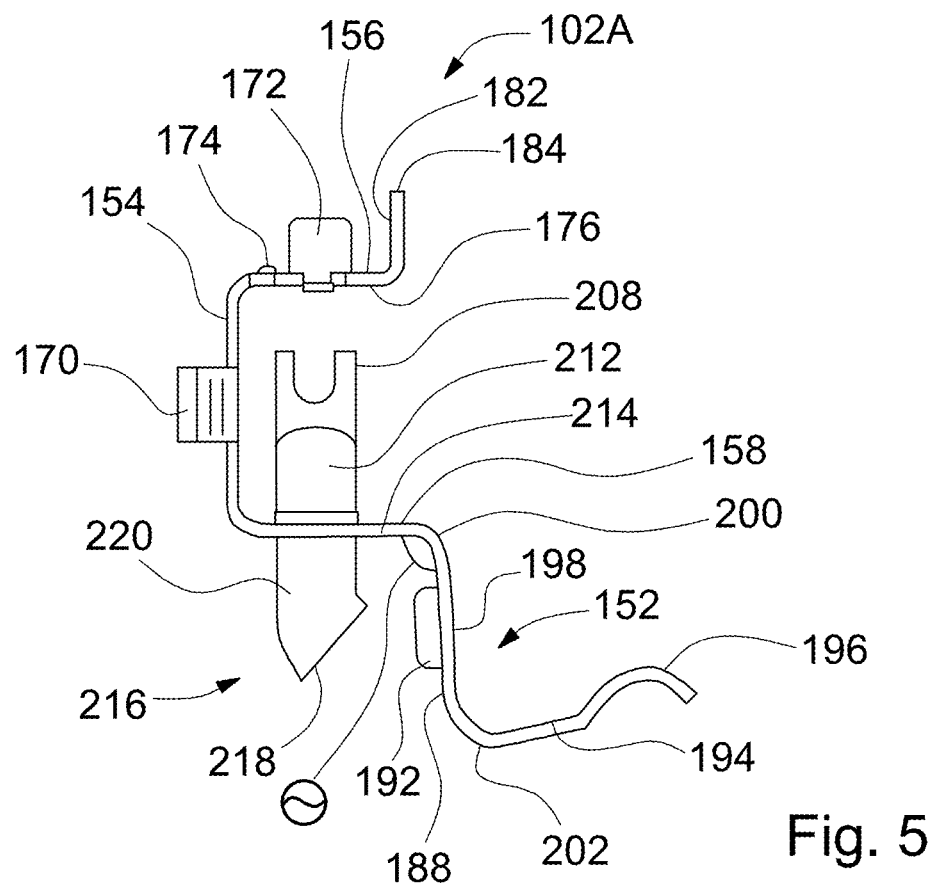
FIG. 5 is an additional elevation view of the brake clip illustrated in FIG. 1.
Figure 6:
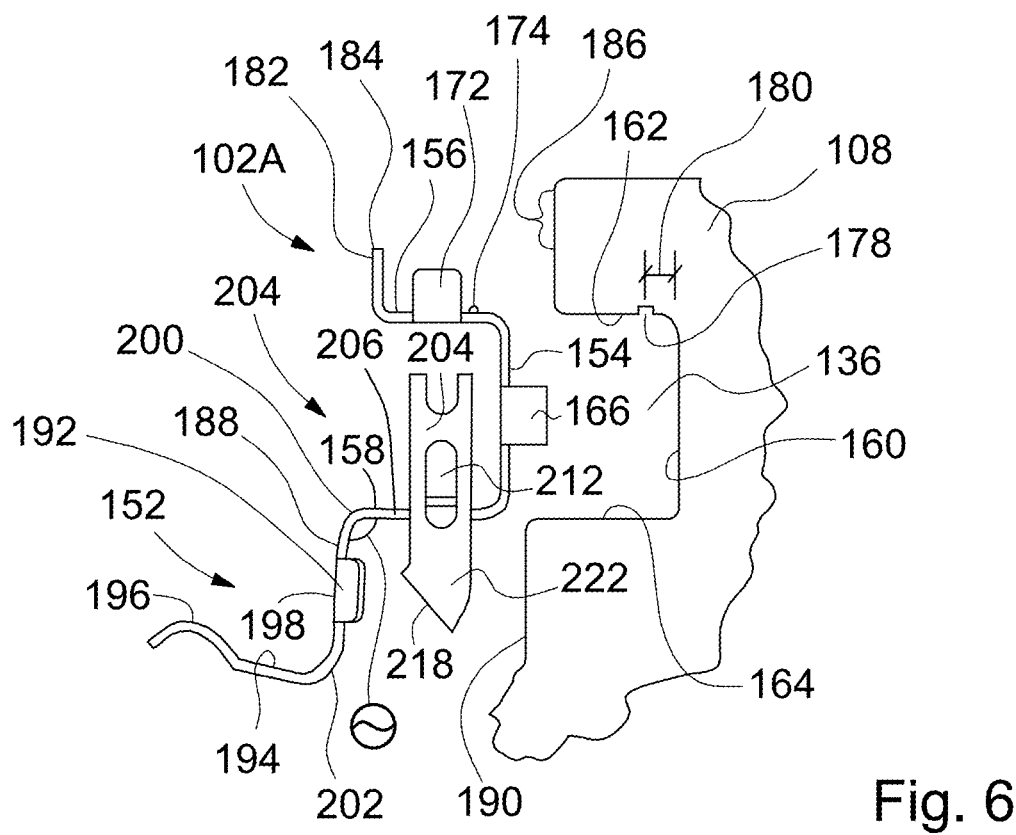
FIG. 6 is an elevation view of the brake clip illustrated in FIG. 1 including a portion of an anchor bracket upon which the brake clip is installed.

Referring now to FIG. 1, there is illustrated selected components of a disc brake assembly, indicated generally at 100, including inboard and outboard first brake clips, respectively indicated generally at 102A and 102B, and inboard and outboard second brake clips, respectively indicated generally at 104A and 104B, shown in an uninstalled position thereon. The disc brake assembly 100 illustrated in FIG. 1 is a well known "Collete" sliding type of disc brake assembly, such as that shown in U.S. Pat. No. 5,323,882 to Waterman et al., U.S. Pat. No. Re 30,255 to Rath et al., and U.S. Patent Publication No. 2013/0192938 to Miller et al., the disclosures of all of these patents and publication are herein incorporated by reference in entirety.

The general structure and operation of the disc brake assembly 100 is conventional in the art. Thus, only those portions of the disc brake assembly 100 which are necessary for a full understanding of this invention will be explained and illustrated in detail. Also, although this invention will be described and illustrated in connection with the particular disc brake assembly 100 disclosed herein, it will be appreciated that this invention may be used in connection with other types of disc brake assemblies. For example, the invention may be used in conjunction with other single piston, twin piston, single opposed piston and twin opposed piston disc brake assemblies, such as shown for example in U.S. Pat. No. 7,784,591 to Franz et al., the disclosure of which is incorporated by reference in entirety herein.

The disc brake assembly 100 includes a generally C-shaped caliper 106, an anchor bracket 108, and outboard and inboard brake pads 110 and 112, respectively. The disc brake assembly 100 is illustrated as being adapted for use on a front left wheel of a vehicle, although such is not required.

The caliper 106 includes an inner section 114 and an outer section 116 connected by a bridge section 118. The caliper 106 is slidably supported on the anchor bracket 108 by first and second guide pins 120A and 120B, respectively, that extend into the anchor bracket 108. The caliper 106 can be secured to the first and second guide pins 120A and 120B, respectively, by first and second guide pin bolts 122A and 122B, respectively. The anchor bracket 108 is, in turn, secured to a stationary component of a vehicle, such as for example an axle flange (not shown) or a steering knuckle (also not shown).

The anchor bracket 108 includes first and second spaced apart non-threaded openings 124A and 124B, respectively, and first and second spaced apart threaded openings 126A and 126B, respectively. The first and second non-threaded openings 124A and 124B, respectively, are each adapted to receive one of the associated first or second guide pins 120A or 120B, respectively. The first and second threaded openings 126A and 126B, respectively, are each adapted to receive a mounting bolt (not shown). The mounting bolts extend through the first and second threaded openings 126A and 126B, respectively, and are received in threaded openings provided in the stationary vehicle component (not shown), thereby securing the anchor bracket 108 to the stationary vehicle component. Alternatively, other known securing methods can be used to secure the caliper 106 to the anchor bracket 108 and/or to secure the anchor bracket 108 to the stationary vehicle component if so desired.

The anchor bracket 108 also includes a pair of axially and outwardly extending first and second arms 128 and 130, respectively, that are interconnected at their outboard ends by an outer tie bar 132 and interconnected at their inboard, ends by an inner tie bar 134.

The first arm 128 is at the first end of the disc brake assembly 100 and the second arm 130 is at the second end of the disc brake assembly 100. Alternatively, the anchor bracket 108 can be constructed to include only one of the outer tie bar 132 or inner tie bar 134 if so desired.

Each of the first and second arms 128 and 130, respectively, includes first and second spaced apart notches or channels, indicated respectively generally at 136 and 138, formed therein (only the first channels 136 are clearly shown, but the second channels 138 are preferably identical to the first channels 136). In particular, the first channels 136 are provided on an inner wall of first arm 128 and are parallel to one another, and the second channels 138 are provided on an inner wall of second arm 130 and are parallel to one another. The first and second channels 136 and 138, respectively, slidably support the outboard brake pad 110 and the inboard brake pad 112 having the inboard and outboard first brake clips 102A and 102B, respectively, and the inboard and outboard second brake clips 104A and 104B, respectively, assembled therewith. Thus, the first and second channels 136 and 138, respectively, are adapted to receive the associated inboard and outboard first brake clips 102A and 102B, respectively, and the associated inboard and outboard second brake clips 104A and 104B, respectively, prior to assembly of the outboard and inboard brake pads 110 and 112, respectively, to the anchor bracket 108.

The outboard brake pad 110 includes an outboard backing plate 140 and an outboard brake friction pad 142. The outboard backing plate 140 includes opposite ends having outwardly projecting first and second outboard guide rails 144A and 144B (only the second outboard guide rail 144B is shown clearly) formed thereon. The first and second outboard guide rails 144A and 144B, respectively, are configured to support the outboard brake pad 142 for sliding movement within the first and second channels 136 and 138, respectively, of the anchor bracket 108.

Similarly, the inboard brake pad 112 includes an inboard backing plate 146 and an inboard friction pad 148. The inboard backing plate 146 includes opposite ends having outwardly projecting first and second inboard guide rails 150A and 150B, respectively, formed thereon. The first and second inboard guide rails 150A and 150B, respectively, are configured to support the inboard brake pad 112 for sliding movement within the first and second channels 136 and 138, respectively, of the anchor bracket 108. Alternatively, the outboard brake pad 110 can be supported on a brake piston of the disc brake assembly 100 while the inboard brake pad 112 can be supported on the inner section 114 of the caliper 106. In the illustrated embodiment, the first and second outboard guide rails 144A and 144B, respectively, and the first and second inboard guide rails 150A and 150B, respectively, each preferably have a generally rectangular cross sectional shape, although such is not required.

Referring now to FIGS. 2-7, there is illustrated the inboard first brake clip 102A. As will be readily understood by one skilled in the art, although only the inboard first brake clip 102A is described and illustrated in FIGS. 2-7, the outboard first brake clip 102B, as well as the inboard and outboard second brake clips 104A and 104B, respectively, are similar.

In FIGS. 2-5 the brake clip 102A is shown in the "free" or uninstalled state. The brake clip 102A includes a body section, indicated generally at 152, having a substantially flat base leg 154. A first or upper leg 156 and a second or lower leg 158 extend outwardly from opposing edges of the base leg 154. The upper leg 156 and the lower leg 158 are flat or planar structures that are substantially parallel with one another and perpendicular with the base leg 154, thereby forming a rectangular shape that generally corresponds with the shape of the first channel 136, although such is not required. Alternatively, the upper leg 156 and the lower leg 158 may be other than flat.

When the brake clip 102A is installed on the anchor bracket 108, the base leg 154 extends along a rear surface 160 of the first channel 136. The upper leg 156 extends along and is generally seated against an upper surface 162 of the first channel 136 in a manner which will be discussed. The lower leg 158 extends along and is generally seated against or otherwise in contact with a lower surface 164 of the first channel 136, although such is not required.

A first side guide 166 extends from the base leg 154 and includes a spring portion 168. A second side guide 170 also extends from the base leg 154, opposite the first side guide 166. The first and second side guides 166 and 170, respectively, are resilient portions. It should be appreciated that the first and second side guides 166 and 170, respectively, can be formed by a stamping operation or, alternatively, may be separate components that are secured to the base leg 154. When the brake clip 102A is installed on the anchor bracket 108, the first and second side guides 166 and 170, respectively, engage side surfaces of the anchor bracket 108 to assist in securing the brake clip 102A to the anchor bracket 108.

As illustrated, the brake clip 102A further includes an optional upper installation tab 172. The installation tab 172 extends outwardly from a side of the upper leg 156 and is angled upwardly therefrom. The installation tab 172 aligns the first inboard guide rail 150A into the first channel 136 during installation of the inboard brake pad 112 on the anchor bracket 108.

A retention tang 174 extends upwardly away from an inner face 176 of the upper leg 156. The inner face 176 faces the lower leg 158. As illustrated, the retention tang 174 extends from the base leg 154. Alternatively, the retention tang 174 may extend from other than the base leg 154. For example, the retention tang 174 may extend from the upper leg 156. When the brake clip 102A is installed on the anchor bracket 108, the retention tang 174 engages with a groove 178 in the upper surface 162 to secure the brake clip 102A to the anchor bracket 108. The groove 178 is provided a distance 180 from the rear surface 160. The distance 180 may be adjusted to establish an air gap between the brake clip 102A and the anchor bracket 108. The retention tang 174 may also create an air gap between the upper leg 156 and the upper surface 162.

A support leg 182 extends from the upper leg 156 and is configured to generally correspond with and extend adjacent to a front surface of the anchor bracket when the brake clip 102A is installed on the anchor bracket 108, although such is not required. As such, the support leg 266 is disposed between the anchor bracket 108 and the inboard backing plate 146 when the associated components of the disc brake assembly 100 are assembled. The support leg 182 includes a terminal edge 184 defining an upper extent or reach of the brake clip 102A. The terminal edge 184 leaves a face portion 186 of the anchor bracket 108 uncovered by the brake clip 102A.

An abutment leg 188 extends downwardly in a generally perpendicular manner from the lower leg 158, although such a configuration is not required. Thus, when the brake clip 102A is installed on the anchor bracket, the abutment leg 188 extends adjacent a lower contact surface 190 of the anchor bracket and is preferably in contact with at least a portion of the lower contact surface. The abutment leg 188 may be a resilient member.

The abutment leg 188 further preferably includes a retention member 192 on an outboard side thereof, although such is not required. The illustrated retention member 192 is a resilient projection that extends from the abutment leg 188 along a side surface of the anchor bracket 108. The retention member 192 opposes a retraction load that is created by retraction of the inboard backing plate 146 relative to the anchor bracket 108. Thus, the retention member 192 prevents the inboard backing plate 146 from pulling the brake clip 102A toward a rotor (not shown) as the friction material of the inboard brake pad 112 wears from use. Further, the retention member 192 may assist in alignment of the abutment leg 188 on the lower contact surface of the anchor bracket when the brake clip 102A is installed thereon. It should be appreciated that the retention member 192 may include a lip, a protrusion, a tab, or any other structural feature that is configured to contact the side surface of the anchor bracket if so desired.

An extension leg 194, in turn, extends from the abutment leg 188. The extension leg 194 is a resilient member that extends outwardly from the lower leg 158. The extension leg 194 stores energy from movement of the inboard brake pad 112. The amount of energy stored in the extension leg 194 is proportional to a length of the extension leg 194. For example, minimizing a length of the extension leg 194 minimizes energy stored in the extension leg 194. For example, the length of the extension leg 194 may be reduced to 10.5 mm from 15 mm. Energy storage in the extension leg 194 may also be reduced by increasing a leg bend inside radius $\theta$. For example, the inside radius $\theta$ may be between 90 and 180 degrees. A loading capacity of the brake clip 102A is also increased as the length of the extension leg 194 is minimized.

An end portion of the extension leg 194 may include a lip portion 196 having a semi-circular cross-sectional shape or any other desired cross-sectional shape. The lip portion 196 is provided to assist in deflection of the extension leg 194.

The abutment leg 188 is bowed—i.e., not planar—between the lower leg 158 and the extension leg 194 such that a midpoint 198 is not on a plane between a top edge 200 of the abutment leg 188 at the lower leg 158 and a bottom edge 202 of the abutment leg 188 at the extension leg 194. The abutment leg 188 bowing away from the lower contact surface 190 creates an air gap between the abutment leg 188 and the lower contact surface 190 of the anchor bracket 108 when the brake clip 102A is installed on the anchor bracket 108. As illustrated, the abutment leg 188 is bowed such that the midpoint 198 is bowed away from the anchor bracket 108. Alternatively, the abutment leg 188 may be bowed such that the midpoint 198 is bowed towards the anchor bracket 108.

The brake clip 102A further includes a retraction spring, indicated generally at 204, extending from a first side 206 the body section 152. The retraction spring 204 includes a spring portion 208, an application portion 210, and a contact lip 212. The application portion 210 applies a spring force generated by the spring portion 208 and extends in a direction transverse to the lower leg 158. As illustrated, the application portion 210 extends generally from the first side 206 towards a second side 214, the second side 214 being opposite the first side 206. Alternatively, the application portion 210 may extend other than from the first side 206 towards the second side 214.

The spring and application portions 208 and 210, respectively, act in a direction transverse to the body section 152. As illustrated, the spring and application portions 208 and 210 act in a spring direction X1, the spring direction being from the first side 206 to the second side 214. Additionally, as one skilled in the art will recognize, the retraction spring 204 may also act as a member sprung from a transition portion, indicated generally at 216, and, as a result, the retraction spring 204 may also act in a direction towards and away from the upper leg 156. The application portion 210 is oriented such that the application portion 210 is in a plane substantially normal to the base leg 154. Alternatively, the spring direction X1 may be other than from the first side 206 to the second side 214.

Thus, the retraction spring 204 is configured to retract the brake pad from contact with a brake rotor (not shown) when a brake pedal (not shown) has been released. The retraction spring 204 retracts the brake pad (not shown) by pulling the brake pad towards the first side 206. The spring portion 208 of the retraction spring 204 includes the transition portion 216. The transition portion 216 has a bend 218 connecting first and second legs 220 and 222, respectively, and will be discussed further.

Figure 7:
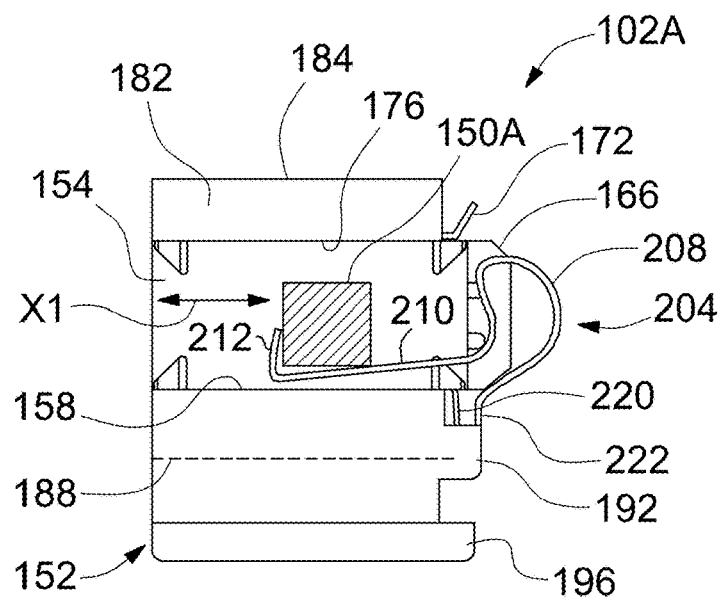
FIG. 7 is a front elevation view of the brake clip illustrated in FIG. 1 in an installed position.

Referring now to FIG. 7, there is illustrated the brake clip 102A in an installed position. As shown therein, in this position the first inboard guide rail 150A is in contact with a portion of the application portion 210 and at the same time biases (downwardly in FIG. 7), the application portion 210. Also, the contact lip 212 captures or restrains a portion of the guide rail 240A. When the first inboard guide rail 150A is installed on the brake clip 102A, the first inboard guide rail 150A displaces the retraction spring 204 away from the first side 206 and towards a second side 214—i.e., the retraction spring 204 is displaced leftwardly in FIG. 7, the second side 214 being opposite the first side 206. This displacement tensions the spring portion 208.

Formation of the transition portion 216 redirects or moves the spring portion 208, application portion 210, and contact lip 212 from extending perpendicular to the spring direction X1 to parallel to the spring direction X1 from the second side 214 to the first side 206. Formation of the spring portion 208 then redirects or moves the application portion 210 and contact lip 212 from parallel to the spring direction X1 from the second side 214 to the first side 206 to parallel to the spring direction X1 from the first side 206 to the second side 214.

Figure 8:
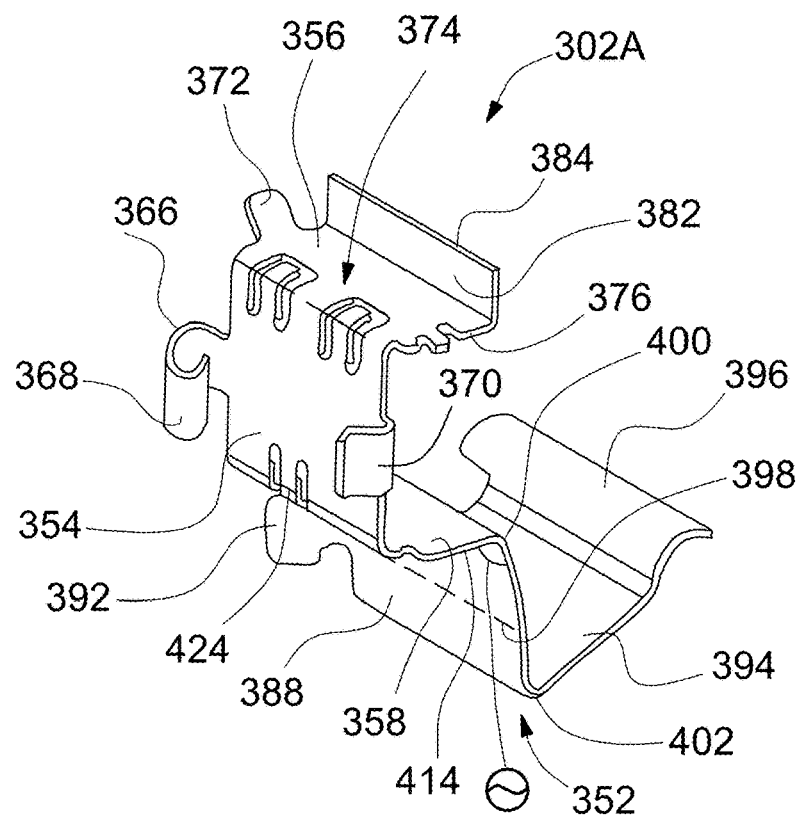
FIG. 8 is a perspective view of a second embodiment of a brake clip in accordance with the present invention.

Referring now to FIG. 8, there is illustrated a second embodiment of a brake clip, indicated generally at 302A, produced in accordance with the present invention. Because the brake clip 302A is a variation of the inboard first brake clip 102A of FIGS. 1-7, like reference numerals, increased by 200, designate corresponding parts in the drawings and detailed description thereof will be omitted.

The brake clip 302A has a plurality of retention tangs, indicated generally at 374. Furthermore, the brake clip 302A has a lower retention tang 424 for engagement with a corresponding groove (not shown) in an anchor bracket (not shown).

Referring now to FIGS. 9-12, there is illustrated a third embodiment of a brake clip, indicated generally at 502, produced in accordance with the present invention. Because the brake clip 502 is a variation of the inboard first brake clip 102A of FIGS. 1-7, like reference numerals, increased by 400, designate corresponding parts in the drawings and detailed description thereof will be omitted.

The brake clip 502 is a bridged style brake clip having first and second brake clip portions, respectively indicated at 626 and 628. The first and second brake clip portions 626 and 628, respectively, are similar. As such, discussion of one of the first or second brake clip portions 626 and 628, respectively, also applies to the other of the first or second brake clip portions 626 and 628, respectively.

The first brake clip portion 626 includes a retraction spring, indicated generally at 630. In turn, the retraction spring 630 has first and second retraction spring portions 632 and 634, respectively. The first retraction spring portion 632 extends from a base leg 554 and is a resilient member. The second retraction spring portion 634 is similar to the retraction spring 204 illustrated in FIGS. 1-7 and extends from the first retraction spring portion 632.

Figure 9:
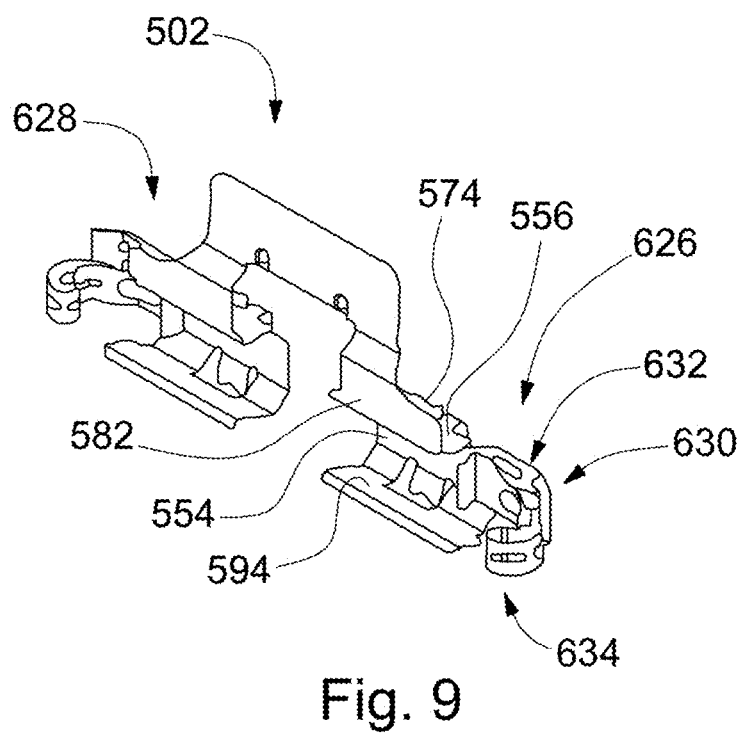
FIG. 9 is a perspective view of a third embodiment of a brake clip in accordance with the present invention.
Figure 10:
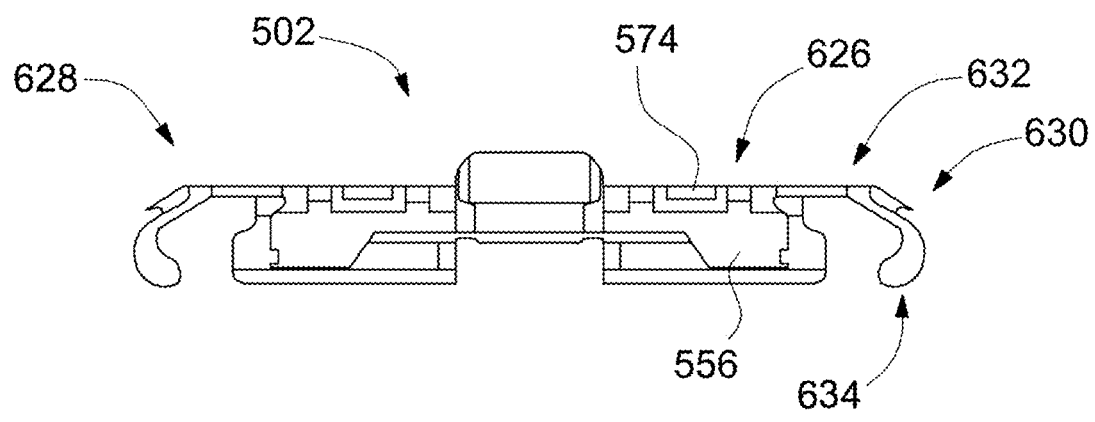
FIG. 10 is a top elevation view of the brake clip of FIG. 9.
Figure 11:
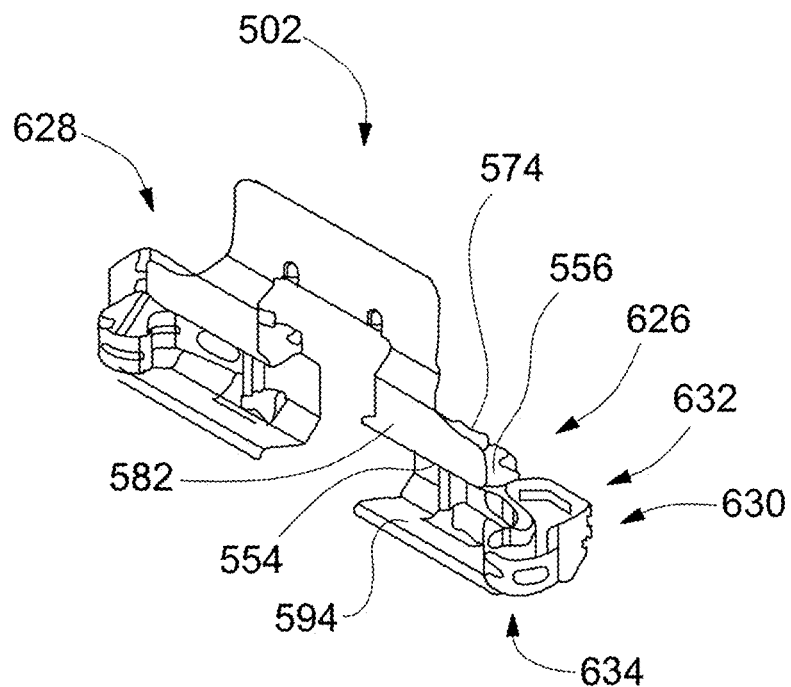
FIG. 11 is an additional perspective view of the brake clip of FIG. 9.
Figure 12:
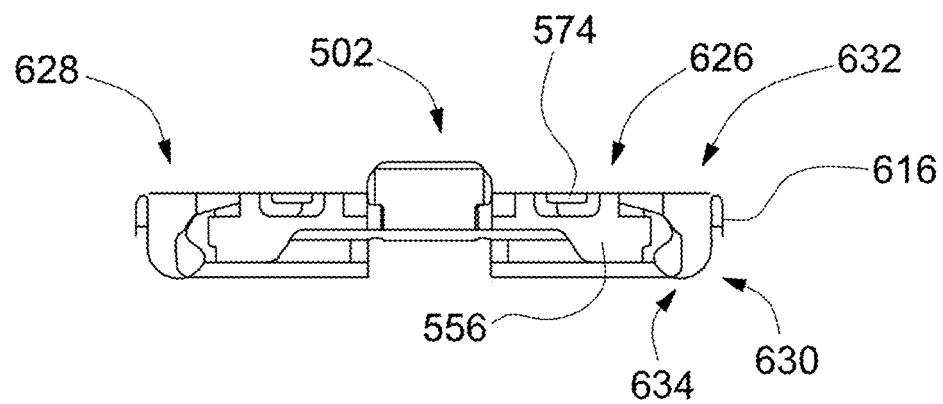
FIG. 12 is a top elevation view of the brake clip of FIG. 11.

FIGS. 9 and 10 illustrate the first and second retraction spring portions 632 and 634, respectively, in a first position in which the first and second retraction spring portions 632 and 634, respectively, are not loaded and FIGS. 11 and 12 illustrate the first and second retraction spring portions 632 and 634, respectively, in a second position in which the first and second retraction spring portions 632 and 634, respectively, are loaded.

When loaded to a threshold load, both the first and second retraction spring portions 632 and 634, respectively, move from the first position to the second position. As illustrated, in the second position, the first retraction spring portion 632 and a transition portion 616 of the second retraction spring portion 634 are at a right angle to the base leg 554. When loaded beyond the threshold load, the first retraction spring portion 632 remains in the second position while the second retraction spring portion 634 continues moving beyond the second position. The threshold load may be calibrated, for example, by adjusting the material or cross section of the first or second retraction spring portions 632 or 634, respectively.

The first and second retraction spring portions 632 and 634, respectively, may be loaded by an actuator moving a brake pad installed on the brake clip 502. The first position is a pre-mounting state to ease mounting of brake pads (not shown). The second position provides greater clearance for installation of disc brake assembly components around the brake clip 502. Such a component may be, for example, the actuator.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A disc brake assembly comprising:
   a brake clip having:
   a U-shaped section having a base leg and opposing upper and lower legs extending from the base leg; and
   a retraction spring having a first retraction spring portion being coplanar with the base leg and extending from the base leg, a second retraction spring portion extending from the first retraction spring portion, and a first position without loading, wherein:
   the first and second retraction spring portions move from the first position to a second position when loaded to a threshold load, wherein when in the second position the first retraction spring portion and a transition portion of the second retraction spring portion are at a right angle to the base leg with the transition portion, the upper leg, and the lower leg extending to the same side of the base leg; and the first retraction spring portion remains at the second position, and the second retraction spring portion moves beyond the second position, when loaded beyond the threshold load.

2. The disc brake assembly of claim 1 wherein the upper leg has an inner face facing the lower leg, and a retention tang extends from the U-shaped section and away from the inner face.

3. The disc brake assembly of claim 2 wherein the retention tang is fixed to the base leg.

4. The disc brake assembly of claim 2 further comprising:
an anchor bracket having a channel in which the brake clip is mounted; and
a groove in an upper surface of the channel, wherein the retention tang is engaged in the groove.

5. The disc brake assembly of claim 4 further comprising:
at least one brake pad supported on the anchor bracket; and
a brake caliper slidably supported on the anchor bracket.

6. The disc brake assembly of claim 1 further comprising:
a support leg extending from the upper leg and configured to generally correspond with and extend adjacent to a front surface of the anchor bracket when the brake clip is installed on the anchor bracket.

7. The disc brake assembly of claim 1 wherein the threshold load is configured to be calibrated by adjusting the material or cross-section of the first and second retraction spring portions.

8. The disc brake assembly of claim 1 wherein the first and second retraction spring portions are resilient portions.

9. A disc brake assembly comprising:
a brake clip having:
a U-shaped section having a base leg and opposing upper and lower legs extending from the base leg, wherein the upper leg has an inner face facing the lower leg and a retention tang extends from the U-shaped section and away from the inner face; and
a retraction spring having a first retraction spring portion being coplanar with the base leg and extending from the base leg, a second retraction spring portion extending from the first retraction spring portion, and a first position without loading, wherein:
the first and second retraction spring portions move from the first position to a second position when loaded to a threshold load, wherein when in the second position the first retraction spring portion and a transition portion of the second retraction spring portion are at an angle to the base leg with the transition portion, the upper leg, and the lower leg extending to the same side of the base leg; and
the first retraction spring portion remains at the second position, and the second retraction spring portion moves beyond the second position, when loaded beyond the threshold load;
wherein the threshold load is configured to be calibrated by adjusting the material or cross-section of the first and second retraction spring portions; and wherein the first and second retraction spring portions are resilient portions.

10. The disc brake assembly of claim 9 wherein the upper leg has an inner face facing the lower leg, and a retention tang extends from the U-shaped section and away from the inner face.

11. The disc brake assembly of claim 10 wherein the retention tang is fixed to the base leg.

12. The disc brake assembly of claim 10 further comprising:
an anchor bracket having a channel in which the brake clip is mounted; and
a groove in an upper surface of the channel, wherein the retention tang is engaged in the groove.

13. The disc brake assembly of claim 12 further comprising:
at least one brake pad supported on the anchor bracket; and
a brake caliper slidably supported on the anchor bracket.

14. The disc brake assembly of claim 9 further comprising:
a support leg extending from the upper leg and configured to generally correspond with and extend adjacent to a front surface of the anchor bracket when the brake clip is installed on the anchor bracket.

15. The disc brake assembly of claim 9 wherein when in the second position the first retraction spring portion and the transition portion of the second retraction spring portion are at a right angle to the base leg.

16. A disc brake assembly comprising:
a brake clip having:
a U-shaped section having a base leg and opposing upper and lower legs extending from the base leg; and
a retraction spring having a first retraction spring portion being coplanar with the base leg and extending from the base leg, a second retraction spring portion extending from the first retraction spring portion, and a first position without loading, wherein:
the first and second retraction spring portions move from the first position to a second position when loaded to a threshold load, wherein when in the second position the first retraction spring portion and a transition portion of the second retraction spring portion are at an angle to the base leg with the transition portion, the upper leg, and the lower leg extending to the same side of the base leg; and
the first retraction spring portion remains at the second position, and the second retraction spring portion moves beyond the second position, when loaded beyond the threshold load, wherein the threshold load is configured to be calibrated by adjusting the material or cross-section of the first and second retraction spring portions.

17. The disc brake assembly of claim 16 further comprising:
an anchor bracket having a channel in which the brake clip is mounted; and
a groove in an upper surface of the channel, wherein the retention tang is engaged in the groove.

* * * * *